Aug. 31, 1926.　　　　　　　　　　　　　　　1,598,524
H. HOLDSWORTH
CLOSURE FOR CONTAINERS
Filed Dec. 16, 1925　　　2 Sheets-Sheet 1

INVENTOR.
Harry Holdsworth.
BY
ATTORNEY

Aug. 31, 1926.
H. HOLDSWORTH
CLOSURE FOR CONTAINERS
Filed Dec. 16, 1925   2 Sheets-Sheet 2
1,598,524
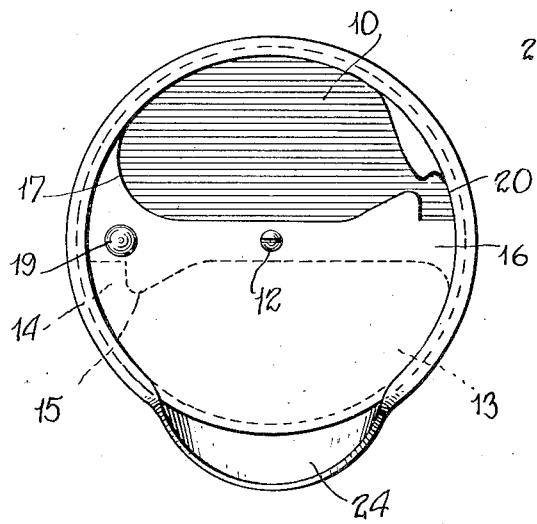
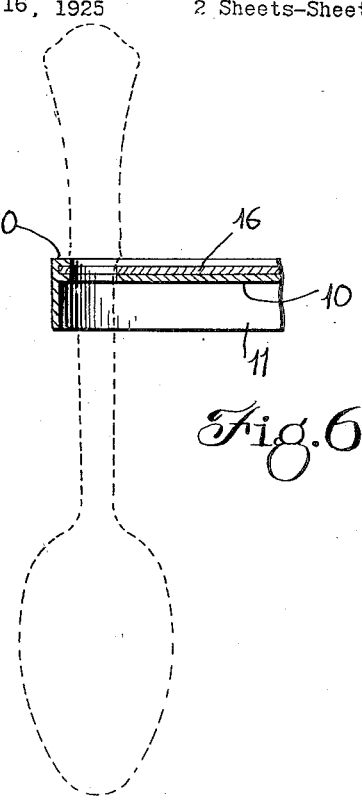
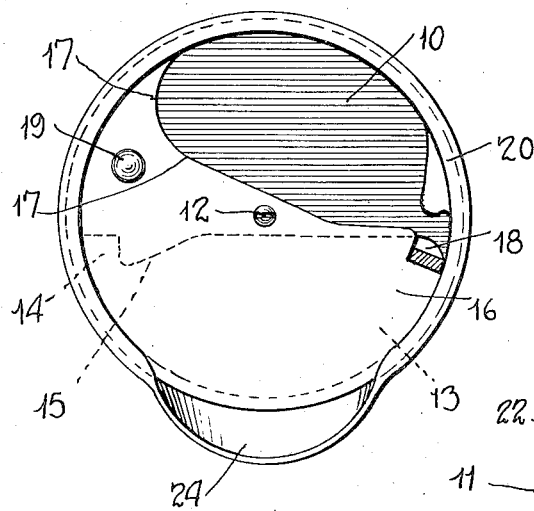
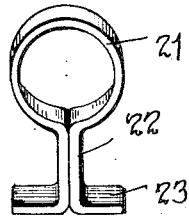
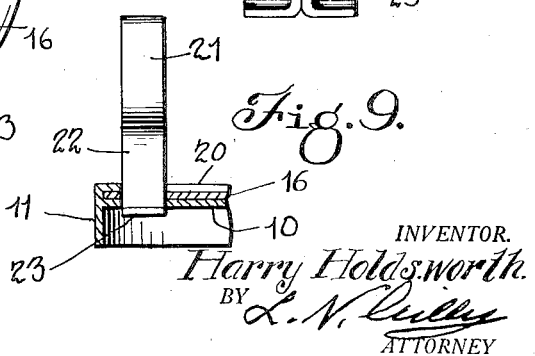
INVENTOR.
Harry Holdsworth.
BY
ATTORNEY Patented Aug. 31, 1926.

1,598,524

UNITED STATES PATENT OFFICE.

HARRY HOLDSWORTH, OF OTEEN, NORTH CAROLINA.

CLOSURE FOR CONTAINERS.

Application filed December 16, 1925. Serial No. 75,818.

This invention relates to closures for containers and has special reference to a sugar dispenser, jar, bottle and food container cover.

One important object of the invention is to improve the general construction of devices of this kind.

A second important object of the invention is to provide an improved container cover which is easily detachable from the container and which may be cheaply manufactured.

A third important object of the invention is to provide an improved cover of this description having an opening therein and a rotatable closure for the opening so arranged that the opening may be opened to any desired degree so that the contents of the container are accessible by means of a spoon or fork or may be poured out, the cover being closable after removing the desired amount of the contents so as to tightly seal the same against the entrance of air.

The fourth important object of the invention is to provide means on the cover for receiving and supporting a spoon, fork, or the like utensil whether the cover is open or closed.

A still further object of the invention is to provide a cover of this character which may be used as a top for culinary utensils such as are used in baking, boiling and the like and also for the vessels or containers made of glass or other material and used in kitchen cabinets.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 5 is a top plan view of the closure in a modified form.

Figure 6 is a section on the line 6—6 of Figure 1 showing the manner in which a spoon or the like may be supported by the cover.

Figure 7 is a plan showing the spoon as supported.

Figure 8 is a detail view of a certain key which may be used for removing the cover from the utensil or container.

Figure 9 is a section on the line 6—6 of Figure 1 showing this key in position for such removal.

Figure 1:
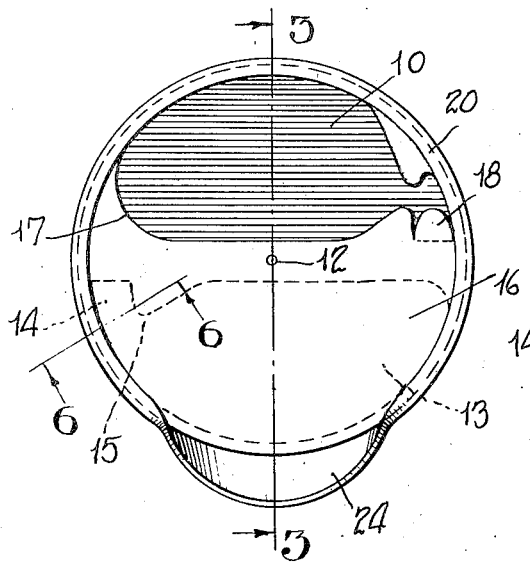
Figure 1 is a plan view of the device.
Figure 2:
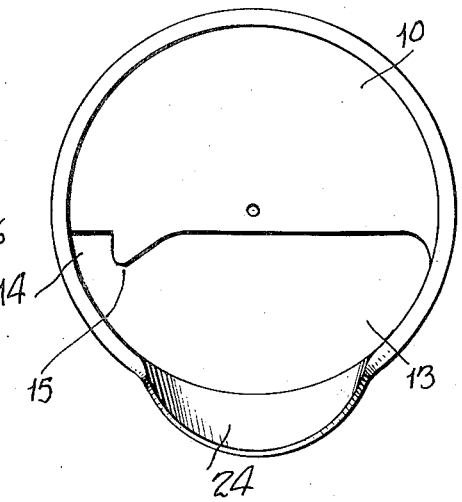
Figure 2 is a plan view thereof with the rotating closure removed.
Figure 3:
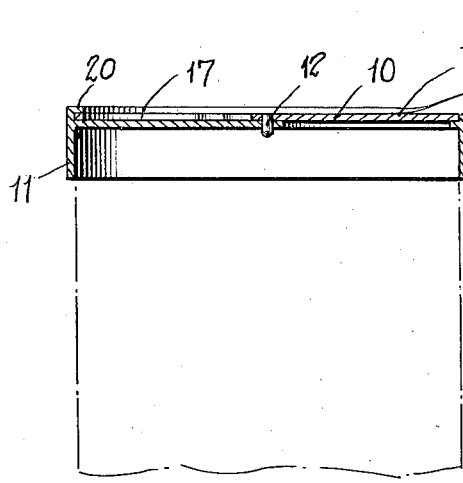
Figure 3 is a section on the line 3—3 of Figure 1.
Figure 4:
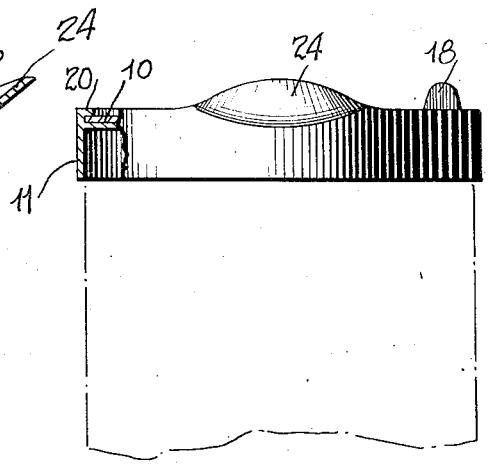
Figure 4 is a side elevation of the complete device, a part of the retaining rim being broken away.

In carrying out the object of this invention there is provided a cover proper having a top 10 which is here shown as flat although the same may be, naturally, of any desired conformation. Depending from the periphery of the top 10 is a flange 11 by means of which the cover may be secured to the container. It is obvious that a number of ways may be used for so securing the cover and inasmuch as no claim is made to any particular way of securing the cover it is thought merely necessary to mention that this flange may be secured by screw threading on to the container, as in the ordinary "Mason" jar, may be held on by a band, crimped under a rib or may be wedged into the mouth of the container. In other words, the flange 11 is to be taken as an indication of any one of the well known means for supporting a cover on a jar or securing the cover thereto. Centrally of the top 10 there is provided a pivot 12 of any suitable type such as a rivet, thumb screw or bolt and I do not desire to restrict myself to any special type of pivot but wish it to be understood that the pivot here shown is typical of any well known form. The cover 10 is provided with an opening having a relatively large body portion 13 and a relatively small extension 14 connected to the body portion by a narrow neck 15. This neck 15 is of such size as to permit passage of the shank of a spoon, fork or the like at its narrow part, while the small opening 14 permits the utensil to drop down and having its handle engaged by the sides of the opening 14 to prevent the utensil from dropping entirely down into the receptacle to which the cover is applied. It will be seen that this is a very useful feature in case the cover is applied to a cooking utensil or to a jar containing liquid or semi-liquid contents such as syrups, honey, preserves, pickles, jams or the like since it prevents the spoon or fork from dropping so far into the contents of the container as to soil the handle.

Mounted on top of this cover is a disk 16 having on one side of its center an opening 17 conforming in shape to the opening in the cover. At the smaller part of this opening there is provided a tab, cut from the material of the disk and bent upward, such tab being shown at 18. This disk 16 is mounted on the pivot 12 so that it may be rotated thereon from the position shown in Figure 1 to a position to bring the opening 17 into coincidence with the opening 13 thus rendering the contents of the container accessible. Now it will be observed that when the openings in the disk and the cover proper are in coincidence the spoon or the like will be held in the smaller portions of these openings. At the same time it will also be noted that rotation of the closure disk 16 may be made in counter clockwise direction so as to bring the same into dotted line position of Figure 7 and in this case the spoon or fork will be held supported in the container while at the same time the opening 13 will be practically closed. Of course the tab 18 may be dispensed with and a knob 19 may be connected to the disk.

While it is obvious that in many instances, the center pivot 12 is all that is necessary to maintain the disk 16 in proper relation to the top 10 yet, where it is desired to ensure a very tight closure of the container some means should be provided for holding the edges of the disk 16 closely against the top, and to this end I provide, in such cases, a flange 20 on the top which overhangs and closely fits the periphery of the disk 16. Of course under these circumstances the disk cannot be readily removed but by omitting the flange 20 and having a pivot 12 such as a thumb screw, threaded bolt or the like the parts may be separated for cleansing. Preferably, in covers for cooking utensils I employ the form wherein the flange is omitted because in such instances separation of the parts for cleansing is practically essential. In other devices such as cans of syrup or preserves sold by stores, this cleansing is not so important while tight sealing is important and in these cases I may use the flange 20.

In Figure 8 there has been shown a certain key. This key comprises a finger loop 21 made from a length of wire and having extensions 22 provided with right angularly disposed projections 23. This key is used to remove such covers as vacuum top covers and the like and is utilized by inserting the key, after opening the cover by rotating the disk 16, through the neck 15 to engage beneath the sides of the cover in the narrow portion 14. By this means a direct upward pull may be made at one portion of the cover adjacent its periphery and the cover lifted off.

In case the cover is used for dispensing granular liquid or semi-liquid contents such as are desired to be poured out rather than dispensed with a spoon, fork or the like there is provided on one side of the top 10 a lip 24 located opposite the opening 13.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new is:

1. In a container closure, a top proper having an opening in one portion thereof, a plate pivoted centrally of the top and having an opening therein corresponding in size with the top opening and rotatable on the top to bring the plate opening into registry with the top opening, and means carried by the plate to rotate the same, said plate having at one part of its opening a passage and a small opening communicating with the main opening and forming a support for a handled utensil, said small opening registering with the top opening upon the plate being partially rotated whereby the utensil may be supported from the top to project into the container through the top opening, said plate being further revoluble to move the utensil supporting opening in an arcuate path across the top opening whereby the plate may be rotated between closed and dispensing positions while a utensil is supported from said plate.

2. In a container closure, a top proper having an opening in one portion thereof, a plate pivoted centrally of the top and having an opening therein corresponding in size with the top opening and rotatable on the top to bring the plate opening into registry with the top opening, and means carried by the plate to rotate the same, said plate having at one part of its opening a passage and a small opening communicating with the main opening and forming a support for a handled utensil, said small opening registering with the top opening upon the plate being partially rotated whereby the utensil may be supported from the top to project into the container through the top opening, the top opening having a projection to engage the handled utensil upon the plate and top openings being brought into registry and the utensil inserted in the small opening, said plate being further revoluble to move the utensil supporting opening in an arcuate path across the top opening whereby the plate may be rotated between closed and dispensing positions while a utensil is supported from said plate.

In testimony whereof I affix my signature.

HARRY HOLDSWORTH.